United States Patent
Chang

(10) Patent No.: US 7,701,556 B2
(45) Date of Patent: Apr. 20, 2010

(54) LIGHT DETECTING CIRCUIT, LASER DISTANCE MEASURING CIRCUIT AND LIGHT DETECTING METHOD

(75) Inventor: Yi-Yang Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/762,285

(22) Filed: Jun. 13, 2007

(65) Prior Publication Data

US 2008/0002177 A1    Jan. 3, 2008

(30) Foreign Application Priority Data

Jun. 30, 2006 (TW) .............................. 95123757 A

(51) Int. Cl.
*G01C 3/08* (2006.01)

(52) U.S. Cl. ..................................... 356/4.07

(58) Field of Classification Search ....... 356/3.01–3.15, 356/4.01–4.1, 5.01–5.15, 6–22
See application file for complete search history.

(56) References Cited

U.S. PATENT DOCUMENTS

| 3,521,123 | A | * | 7/1970 | Armstrong et al. | 315/194 |
| 4,584,477 | A | * | 4/1986 | Yoshino et al. | 250/351 |
| 4,755,818 | A | * | 7/1988 | Conrad | 340/961 |
| 2003/0123168 | A1 | * | 7/2003 | Yokomizo | 359/896 |

* cited by examiner

*Primary Examiner*—Thomas H. Tarcza
*Assistant Examiner*—Luke D Ratcliffe
(74) *Attorney, Agent, or Firm*—Thomas, Kayden, Horstemeyer & Risley

(57) ABSTRACT

A light detecting circuit includes a power source circuit, an optoelectronic component, a switch and a Trans Impedance Amplifier (TIA) circuit. The power source circuit provides an electric signal. When the optoelectronic component is biased at a bias voltage, the optoelectronic component generates a corresponding current according to the received light density. The switch has a trigger receiver. After the trigger receiver receives a trigger signal, the switch turns on and the optoelectronic component is biased at the bias voltage. The TIA circuit transforms the corresponding current to a corresponding voltage and then calculates the corresponding voltage to obtain the light density.

17 Claims, 1 Drawing Sheet

LIGHT DETECTING CIRCUIT, LASER DISTANCE MEASURING CIRCUIT AND LIGHT DETECTING METHOD

RELATED APPLICATIONS

The application claims priority to Taiwan Application Serial Number 95123757, filed Jun. 30, 2006, which is herein incorporated by reference.

BACKGROUND

1. Field of Invention

The present invention relates to a light detecting circuit. More particularly, the present invention relates to a laser distance measuring circuit, which can reduce the current saturation phenomena by the reflection of inner side of laser.

2. Description of Related Art

Generally, distance from an object can be measured with an electronic distance measuring meter. The electronic distance measuring meter needs a reflecting prism or a reflecting sticker to measure the distance more accurately.

A single tube laser distance measuring meter does not need a reflecting prism or a reflecting sticker to measure the distance. The single tube laser distance measuring meter uses a reflecting laser to measure the distance from an object. After the single tube laser distance measuring meter emits a laser beam, the laser beam is reflected from the object surface. The single tube laser distance measuring meter uses an avalanche photo diode (APD) to detect the reflected laser beam and generate responding current. Then, a current to voltage transformer transforms the responding current from the APD to a responding voltage. Next, messages included in the responding voltage are evaluated to determine the distance of an object.

The paths of the emitted laser beam and received laser beam of the single tube laser distance measuring meter are on the same axis. When the laser beam is emitted, the laser beam passes through the prism group in the single tube laser distance measuring meter first. Because the refraction indexes of each prism in the prism group are not the same, a part of the emitted laser beam would be reflected, which results an error in the measurement. The APD receives the reflected part of the emitted laser beam and produces a current saturation phenomenon, which affects the shortest measuring distance of the single tube laser distance measuring meter.

To solve the aforementioned problem, an improved Trans Impedance Amplifier (TIA) circuit to refine the short distance measuring function of the laser distance measuring meter is used. However, if the TIA circuit is implemented, the accuracy of measuring the long distance is sacrificed.

SUMMARY

A light detecting circuit includes a power circuit, an optoelectronic device, a switch circuit and a transform impedance amplifier.

The power circuit provides a power signal. The optoelectronic device generates a corresponding current according to the amplitude of the light receiving signal. The switching circuit includes a trigger receiver, after the trigger receiver receives a trigger signal, the switching circuit is turned on. The voltage from the voltage source is transmitted from the switch circuit to the optoelectronic device. The corresponding current is received and transformed into the corresponding voltage to obtain the intensity of the light signal by the transform impedance amplifier.

A laser distance measuring circuit includes a power circuit, a laser emitter, an optoelectronic device, a switching circuit and a transform impedance amplifier.

The power circuit provides a power signal. The laser emitter emits a laser beam to a surface, and the surface reflects the laser beam. After a specific period of time after the laser beam is emitted, a controlling terminal transmits a trigger signal. The optoelectronic device generates a corresponding current according to the reflected laser beam. The switching circuit includes a trigger receiver. After the trigger receiver receives the trigger signal, the switching circuit is turned on, and the power signal is transmitted from the switching circuit to the optoelectronic device. The transform impedance amplifier receives the corresponding current and transforms a corresponding voltage to measure the distance between the surface and the laser emitter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
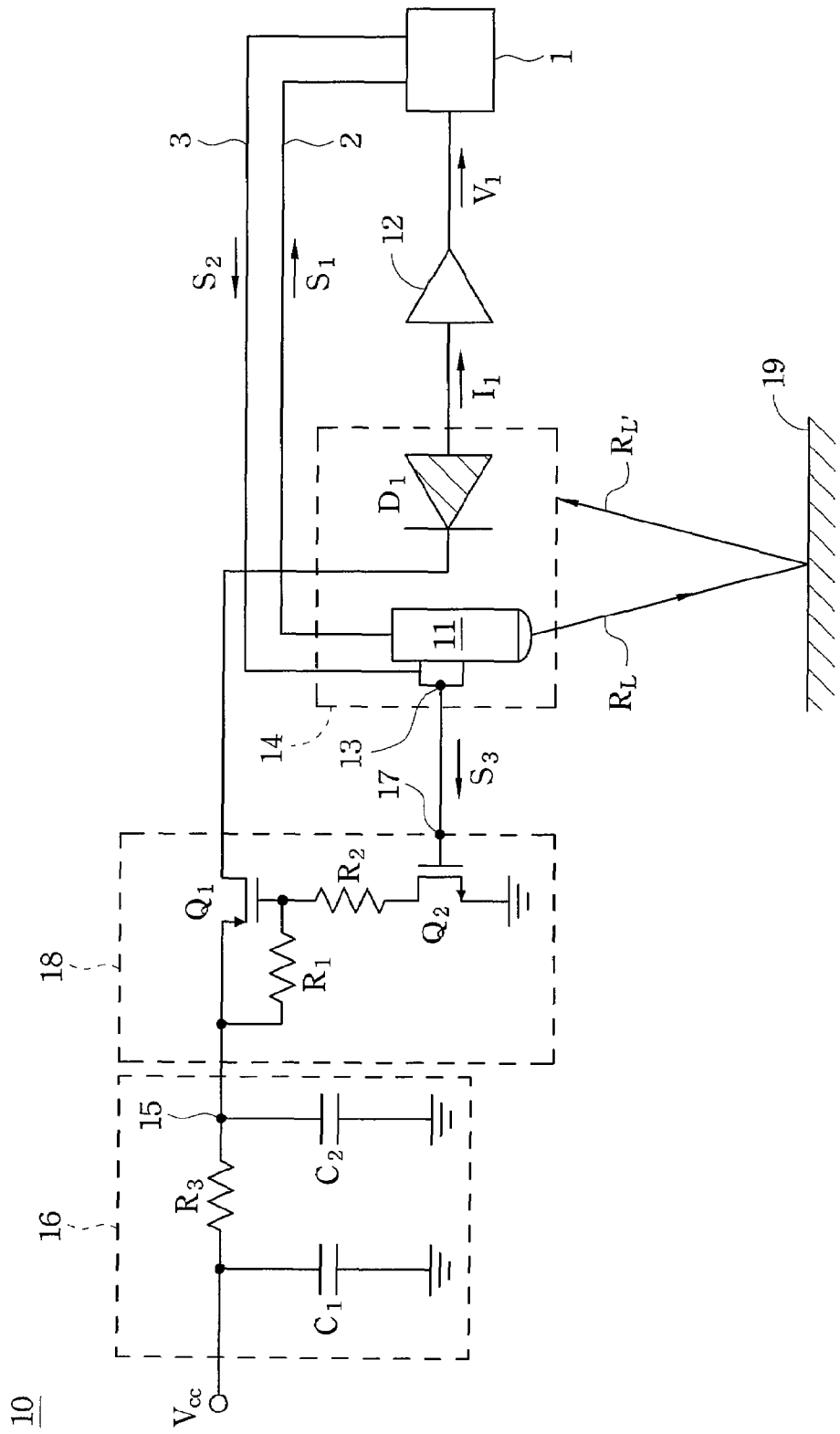
FIG. 1 illustrates a laser distance measuring circuit according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Refer to FIG. 1. FIG. 1 illustrates a laser distance measuring circuit (i.e. a light detecting circuit) according to an embodiment of the present invention. The laser distance measuring circuit 10 includes a current to voltage transformer 12, an emitting and receiving module 14, a voltage source module 16 and a switching circuit 18.

The voltage source module 16 includes a voltage source VCC, a resistance $R_3$, a capacitance $C_1$ and a capacitance $C_2$. The voltage source VCC is connected to the capacitance C1 and the resistance R3. The resistance R3 is connected between the capacitance C1 and capacitance C2. The resistance R3 and the capacitance C2 are connected with a voltage source output 15. Hence, the voltage source output 15 provides a stable DC voltage.

The switching circuit 18 can work properly under 250 Volts (V), and the reaction time of the switching circuit 18 is at the nanosecond level. The switching circuit 18 includes a P-type transistor Q1, an N-type transistor Q2, a resistance R1 and a resistance R2. The receiving module 14 includes a laser beam emitter 11 and an avalanche photo diode (APD) D1.

The voltage source module 16 can be replaced with another power supply system, for example, a current supply system. The avalanche photo diode D1 can be replaced with another optoelectronic device, for example, a photo diode (PD). The laser beam emitter 11 can use a laser diode (LD) transforming an electronic signal into a light signal.

After the laser beam emitter 11 emits a laser beam $R_L$, the laser beam $R_L$ hits a surface 19. Then, the laser beam $R_L'$ is reflected from the surface 19. Meanwhile, the laser beam emitter 11 transmits a controlling signal S1 to a controlling and measuring module 1 along a first signal line 2. After a specific period of time the laser beam $R_L$ has been emitted, the controlling and measuring module 1 transmits an activating signal S2 to a controlling terminal 13 along a second signal line 3. The controlling terminal 13 outputs a trigger signal S3 to a trigger receiver 17 of the switching circuit 18, and the N-type transistor Q2 is turned on. At the same time, the source voltage of the P-type transistor Q1 is higher than the gate voltage of the P-type transistor Q1, so the P-type transistor Q1 is tuned on, too.

Because of the aforementioned condition, the stable DC voltage from the voltage source output 15 can be transmitted to the avalanche photo diode D1 by the P-type transistor Q1, and between two sides of the avalanche photo diode D1 with a bias voltage.

After the laser beam emitter 11 emits a laser beam $R_L$, the laser beam $R_L$ hits a surface 19. Then, a laser beam $R_L'$ is reflected from the surface 19. The avalanche photo diode D1 generates a corresponding current $I_1$ responding to the laser beam $R_L'$. The current to voltage transformer 12 transforms a corresponding voltage $V_1$ according to the received corresponding current $I_1$. The controlling and measuring module 1 reads the corresponding voltage $V_1$ to obtain a value of the corresponding voltage $V_1$.

The intensity of the laser beam $R_L'$ is proportional to the corresponding current $I_1$. The corresponding current $I_1$ is proportional to the corresponding voltage $V_1$, too. Hence, the distance between the surface 19 and the laser beam emitter 11 can be obtained by calculating the value of the corresponding voltage $V_1$ measured with the controlling and measuring module 1.

In the conventional system without the switch circuit 18, when using the conventional laser distance measuring meter measures a target in short distance, the reflection in the prism group produces a current saturation phenomenon of avalanche photo diode (APD) D1, and forms a greater error in the measurement. The error affects the shortest measuring distance of the conventional laser distance measuring meter.

According to the switch circuit of the laser distance measuring circuit of the embodiment of the present invention, the laser distance measuring meter emits a laser beam, at the meanwhile, the controlling terminal 13 outputs a trigger signal S3 has lower voltage. The trigger signal 13 makes the electric potential of the source and the drain of transistor Q2 equal and being a broken circuit. The electric potential of the source and the drain of transistor Q1 are equal and being a broken circuit, too.

Hence, there is no bias apply on the avalanche photo diode D1, so the avalanche photo diode D1 can not be drove. For this reason, the current saturation phenomenon of avalanche photo diode D1 can be avoided. After a specific period of time of the laser beam is emitted, the transistor Q1 and the transistor Q2 are turned on. Then, there is a bias apply on the avalanche photo diode D1.

The aforementioned switch circuit 18 can sustain high voltage and respond with high speed. The working voltage of the switch circuit 18 can be 250 Volt (V), and the switching speed is in nano-second scale.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light detecting circuit comprising:
   a power circuit providing a power signal;
   an optoelectronic device generating a corresponding current according to the amplitude of a received light signal; and
   a switching circuit comprising:
   a trigger receiver;
   a first transistor comprising a first source, a first drain and a first gate, the first source connecting with the power circuit, the first drain connecting with the optoelectronic device;
   a second transistor comprising a second source, a second drain and a second gate, the second source connecting with a ground terminal, the second gate connecting with the trigger receiver to receive a trigger signal;
   a first resistance connected between the power circuit and the first gate; and
   a second resistance connected between the first gate and the second drain, wherein the switching circuit is turned on when the trigger receiver receiving the trigger signal and the switching circuit transmits the power signal to the optoelectronic device.

2. The light detecting circuit of claim 1, wherein the power circuit further comprises a third resistance, a first capacitance and a second capacitance, the third resistance is connected between the first capacitance and the second capacitance, the first capacitance is connected between a voltage source of the power circuit and the ground terminal, and the second capacitance is connected between the switching circuit and the ground terminal.

3. The light detecting circuit of claim 1, further comprising a transform impedance amplifier, wherein the transform impedance amplifier receives the corresponding current and transforms the corresponding current into a corresponding voltage.

4. The light detecting circuit of claim 3, wherein the corresponding current is proportional to the corresponding voltage.

5. The light detecting circuit of claim 3, wherein the corresponding voltage is proportional to the amplitude of the light signal.

6. The light detecting circuit of claim 1 further comprising a laser emitter to emit a laser beam, and a controlling terminal transmitting the trigger signal after a predetermined period the laser beam is emitted.

7. The light detecting circuit of claim 1, wherein the optoelectronic device is an avalanche photo diode (APD).

8. A laser distance measuring circuit comprising:
   a power circuit providing a power signal;
   a laser emitter emitting a laser beam to a surface and reflected by the surface, and a controlling terminal transmits a trigger signal after a predetermined period the laser beam has been emitted;
   an optoelectronic device generating a corresponding current according to the reflected laser beam;

a switching circuit comprising:

a trigger receiver;

a first transistor comprising a first source, a first drain and a first gate, the first source connected with the voltage source circuit, and the first drain connecting with the optoelectronic device;

a second transistor comprising a second source, a second drain and a second gate, the second source connecting with a ground terminal, and the second gate connecting with the trigger receiver to receive the trigger signal;

a first resistance connecting between the voltage source circuit and the first gate; and a second resistance connecting between the first gate and the second drain, wherein the switching circuit is turned on when the trigger receiver receives the trigger signal, and the switching circuit transmits the power signal to the optoelectronic device; and a transform impedance amplifier receiving the corresponding current and transforming the corresponding current into a corresponding voltage to determine a distance between the surface and the laser emitter.

9. The laser distance measuring circuit of claim 8, wherein the power circuit further comprises:

a third resistance, a first capacitance and a second capacitance, the third resistance connecting between the first capacitance and the second capacitance, the first capacitance connecting between a voltage source of the power circuit and the ground terminal, and the second capacitance connecting between the switching circuit and the ground terminal.

10. The laser distance measuring circuit of claim 8, wherein the corresponding current is proportional to the corresponding voltage.

11. The laser distance measuring circuit of claim 8, wherein the corresponding voltage is proportional to the distance.

12. The laser distance measuring circuit of claim 8, wherein the optoelectronic device is an avalanche photo diode (APD).

13. A light detecting method applied to a light detecting circuit, comprising:

(a) providing a power signal generated by a power circuit to the light detecting circuit;

(b) applying an optoelectronic transforming device for generating a corresponding current according to the amplitude of a received light signal; and (c) receiving a trigger signal from a switch with a trigger receiver to turn on the switch, and the switch transmits the power signal to the optoelectronic transforming device, wherein the switch comprises:

a first turn-on device comprising a first connector, a second connector and a third connector, the first connector connects with the power circuit, and the second connector connecting with the optoelectronic transforming device;

a second turn-on device comprising a fourth connector, a fifth connector and a sixth connector, the fourth connector connects with a ground terminal, the sixth connector connects with the trigger receiver for receiving the trigger signal;

a first impedance connected between the power circuit and the third connector; and a second impedance connected between the third connector and the fifth connector.

14. The light detecting method of claim 13, wherein the corresponding current is direct proportional to the corresponding voltage.

15. The light detecting method of claim 13, wherein the corresponding voltage is proportional to the amplitude of the received light signal.

16. The light detecting method of claim 13, further comprising outputting the trigger signal by a controlling terminal after a specific period of a laser beam emitter emitting a laser beam.

17. The light detecting method of claim 16, wherein the trigger signal is a high voltage signal.

* * * * *